United States Patent
Yan et al.

(10) Patent No.: US 12,371,196 B2
(45) Date of Patent: Jul. 29, 2025

(54) METHOD, DEVICE, AND STORAGE MEDIUM FOR FLIGHT TRAJECTORY REPLAY

(71) Applicant: SZ DJI TECHNOLOGY CO., LTD., Shenzhen (CN)

(72) Inventors: Jiang Yan, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1134 days.

(21) Appl. No.: 17/238,188

(22) Filed: Apr. 22, 2021

(65) Prior Publication Data
US 2021/0237871 A1    Aug. 5, 2021

Related U.S. Application Data

(63) Continuation of application No. PCT/CN2018/112689, filed on Oct. 30, 2018.

(51) Int. Cl.
*B64U 10/13* (2023.01)
*G05D 1/00* (2006.01)

(52) U.S. Cl.
CPC ............. *B64U 10/13* (2023.01); *G05D 1/101* (2013.01); *B64U 2201/10* (2023.01)

(58) Field of Classification Search
CPC .......................... B64C 39/024; B64U 2201/10
See application file for complete search history.

(56) References Cited

U.S. PATENT DOCUMENTS 7,706,979 B1    4/2010  Herwitz
2008/0009964 A1  1/2008  Bruemmer et al.
(Continued)

FOREIGN PATENT DOCUMENTS

CN    101477169 A    7/2009
CN    102207736 A    10/2011
(Continued)

OTHER PUBLICATIONS

Simpson, Trajectory-Planning Model Enables Safe UAV Flight at Speed, https://www.unmannedsystemstechnology.com/2019/12/trajectory-planning-model-enables-safe-uav-flight-at-speed/ (Year: 2019).*

(Continued)

*Primary Examiner* — Aryan E Weisenfeld
(74) *Attorney, Agent, or Firm* — ANOVA LAW GROUP, PLLC (57) ABSTRACT

Embodiments of the present disclosure provides method, device, and storage medium for flight trajectory replay. The method includes obtaining flight state data collected by an aircraft at a plurality of flight times, and generating an original flight path based on the flight state data, the flight state data including at least one of a position, a speed, or an acceleration of the aircraft; determining a safe speed of each position in the original flight path based on the original flight path; and generating a replay trajectory based on the safe speed of each position, and generating a control instruction based on the replay trajectory for controlling the aircraft to fly along the replay trajectory. While generating the replay trajectory, the aircraft can fly at a constant speed during the replay.

20 Claims, 7 Drawing Sheets

(56) References Cited

U.S. PATENT DOCUMENTS

2009/0132103 A1 5/2009 Marty et al.
2017/0254664 A1 9/2017 Parekh et al.
2018/0267562 A1 9/2018 MacCready et al.

FOREIGN PATENT DOCUMENTS

| CN | 102929284 A | 2/2013 |
| CN | 105589472 A | 5/2016 |
| CN | 105953800 A | 9/2016 |
| CN | 106020236 A | 10/2016 |
| CN | 106056948 A | 10/2016 |
| CN | 107516437 A | 12/2017 |
| CN | 107992078 A | 5/2018 |
| JP | 6051327 B1 | 12/2016 |
| WO | 2018092971 A1 | 5/2018 |

OTHER PUBLICATIONS

National Study of Tactical Aerial Resource Management to Support Initial Attack and Large Fire Suppression (Year: 2008).*
Simpson (Year: 2019).*
Tarms (Year: 2008).*
Simpson Pictures (Year: 2019).*
The World Intellectual Property Organization (WIPO) International Search Report for PCT/CN2018/112689 Aug. 9, 2019 6 pages.

* cited by examiner

METHOD, DEVICE, AND STORAGE MEDIUM FOR FLIGHT TRAJECTORY REPLAY

CROSS-REFERENCE TO RELATED APPLICATION

This application is a continuation of International Application No. PCT/CN2018/112689, filed Oct. 30, 2018, the entire content of which is incorporated herein by reference.

TECHNICAL FIELD

The present disclosure relates to the field of computer technology and, more specifically, to method, device, and storage medium for flight trajectory replay.

BACKGROUND

Trajectory replay is very useful in the field of unmanned driving. During the trajectory replay, an aircraft can record the time-significant waypoints, that is, record the position, speed, acceleration and time, generate the replay trajectory by using an optimization method, and follow the trajectory, thereby realizing repetitive flight after one rehearsal. The trajectory replay effect obtained using such method is better. However, since the recorded waypoints include the meaning of time, when the original trajectory includes paused waypoints (most of the original trajectories include the paused waypoint), it is difficult for the aircraft to move at a constant speed during the replay, which causes unneeded pauses in the trajectory replay and affects the trajectory replay effect.

Therefore, the current trajectory replay method cannot achieve a uniform trajectory replay.

SUMMARY

Embodiments of the present disclosure provide method, device, and storage medium for flight trajectory replay, which realize the uniform flight at a constant speed of the aircraft in the replay process.

One aspect of the embodiments of the present disclosure provides a flight trajectory replay method, including obtaining flight state data collected by an aircraft at a plurality of flight times, and generating an original flight path based on the flight state data, the flight state data including at least one of a position, a speed, or an acceleration of the aircraft; determining a safe speed of each position in the original flight path based on the original flight path; and generating a replay trajectory based on the safe speed of each position, and generating a control instruction based on the replay trajectory for controlling the aircraft to fly along the replay trajectory.

Another aspect of the embodiments of the present disclosure provides a flight trajectory replay device, including a memory and a processor. The memory is configured for storing program codes; and a processor is configured to call the program codes and, when the program codes being executed, configured to perform: obtaining flight state data collected by an aircraft at a plurality of flight times, and generating an original flight path based on the flight state data, the flight state data including at least one of a position, a speed, or an acceleration of the aircraft; determining a safe speed of each position in the original flight path based on the original flight path; and generating a replay trajectory based on the safe speed of each position, and generating a control instruction based on the replay trajectory for controlling the aircraft to fly along the replay trajectory.

Another aspect of the embodiments of the present disclosure provides a mobile platform including a body; a power system mounted on the body for providing power to the mobile platform; and the disclosed flight trajectory replay device.

Another aspect of the embodiments of the present disclosure provides a control device including a device body; a communication device mounted on the device body for communicating with the disclosed mobile platform and communicating with the disclosed flight trajectory replay device.

In the embodiments of the present disclosure, the aircraft can generate the original flight trajectory based on the flight state data collected at a plurality of times, such that the replay trajectory can be generated based on the safe speed of each position in the original flight trajectory, and the aircraft can be controlled to fly along the replay trajectory. Since the safe speed of each position can include a maximum safe speed and a minimal safe speed, and different replay trajectories can be generated based on the difference of the safe speed. In addition, different replay trajectories can also be generated based on the relationship between the safe speed and the predetermined speed, making the generated replay trajectory more in line with actual needs, and ensuring that the trajectory replay process is performed at a constant speed based on the safe speed.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Trajectory replay has high application demands in unmanned aerial vehicles (UAVs). For example, after the user control the UAV to go through woods or a maze, the UAV may follow the trajectory replay and return along the original path, thereby realizing the time-lapse video or image shooting. Alternatively, trajectory replay can also be used in power and pipeline inspections to re-examine along the original path. The conventional method in the above-mentioned trajectory replay application scenario is that a pilot will manually fly the UAV along a pre-planned path, the UAV records the waypoint information during the flight, including time, position, speed, acceleration, and other information, and then the UAV may automatically replay the original flight path based on the recorded waypoint information. This method generally causes the UAV to record some pauses of the pilot, such as making the UAV pause when observing the environment and confirming the position, as such, the pauses will be repeated when replaying the trajectory, but in fact this type of pause is not needed in the replay. Currently, there are two conventional method to achieve trajectory replay.

1. When the aircraft is in flight, it may record waypoints (tracking points) without time significance. That is, only the flight positions p may be recorded during the flight, and then a pure geometric method (such as the Bezier curve) may be used to generate the trajectory path, such that the path can be followed based on the geometric method. It is easier to achieve a constant speed flight by using the above-mentioned path following (trajectory replay) method. However, since the generated path does not have a high degree of restoration to the original trajectory, the path following method is more complicated, and many tests may be needed to determine the feasibility of each trajectory point on the trajectory. Therefore, the method of using such recorded waypoints without time significance and implementing path following through aggregation has the issue of low following accuracy.

2. The aircraft may record time-significant waypoints during flight, such as recording the position p, the speed v, the acceleration a, and the time t, and then generate the replay trajectory by using an optimization method, such as the primitive trajectory generation method. A better replay trajectory can be obtained, the trajectory following control is simple, and the following accuracy is high by using this method. However, since the trajectory information includes the time significance of the original trajectory, if the aircraft includes a pause operation during the original trajectory (in practical applications, the pause operations is common), then it may be difficult to achieve a constant speed flight during the trajectory replay, and the aircraft will pause where the original trajectory has the pause. In this way, the effect of the video or image captured by the aircraft during the trajectory replay is poor.

It can be seen that the use of the first trajectory replay method has the issue of poor replay effect of the original trajectory, the path following method is more complicated, and the path following accuracy is low. Further, in the second trajectory replay method, since the replayed trajectory includes the time significance of the original flight path, it is difficult for the aircraft to maintain a constant speed flight during the trajectory replay.

Figure 1:
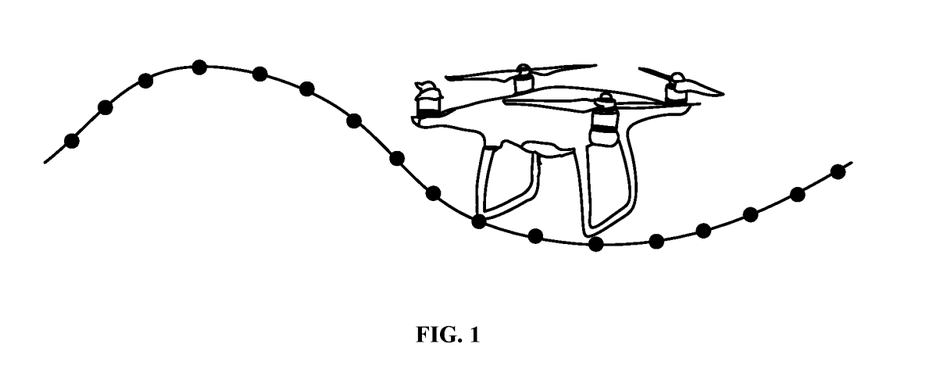
FIG. 1 is a schematic diagram of an aircraft collecting multiple flight state data according to an embodiment of the present disclosure.

As such, the present disclosure provides a flight trajectory replay method that may keep the aircraft flying at a constant speed during the trajectory replay. The method can improve the replay effect of the aircraft during trajectory replay. When this method is used for trajectory replay, the aircraft may collect flight state data at a plurality of times during flight. As shown in FIG. 1, the aircraft may collect the flight state data at the time of flight corresponding to the positions identified by the dots as shown in FIG. 1, and generate an original flight path based on one or more of the aircraft's position, speed, and acceleration recorded by the flight state data. Therefore, the safe speed of each position in the original flight path may be determined based on the original flight path, such that the replay trajectory can be generated based on the safe speed of each position. As such, the aircraft may be controlled to fly along the replay trajectory based on a control instruction generated by the replay trajectory, such that the aircraft can maintain a constant speed during the replay. It can be understood that the dots in FIG. 1 are merely for illustration purposes, and the frequency of the aircraft's collection position may be set based on a sampling rate of a flight control system or a sensor.

In one embodiment, when generating the replay trajectory based on the safe speed of each position, the minimum safe speed may be first determined from the safe speed of each position, and the replay trajectory may be generated based on the minimum safe speed. Further, a control instruction may be generated based on the replay trajectory generated at the minimum safe speed to control the aircraft to fly at the minimum safe speed during the trajectory replay.

Figure 2A:
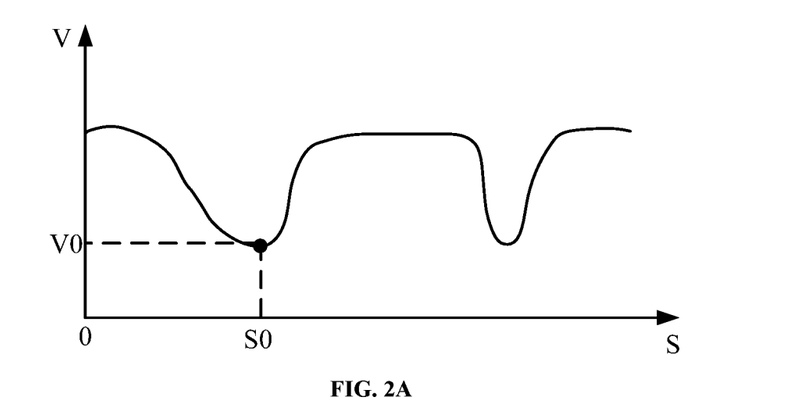
FIG. 2A is a schematic diagram of a safe speed according to an embodiment of the present disclosure.

If the safe speed of each position is as shown in FIG. 2A and the minimum safe speed among the safe speeds of each position in FIG. 2A is the safe speed v0 corresponding to a point s0, then the replay trajectory can be generated based on the safe speed v0 corresponding to the point s0, and the aircraft can be controlled to perform the trajectory replay at the safe speed v0.

In another embodiment, when generating the replay trajectory based on the safe speed of each position, the maximum safe speed may also be determined from the safe speed of each position, and the replay trajectory may be generated based on the maximum safe speed. Further, the control instruction may be generated based on the replay trajectory generated at the maximum safe speed to control the aircraft to fly at the maximum safe speed during the trajectory replay.

Figure 2B:
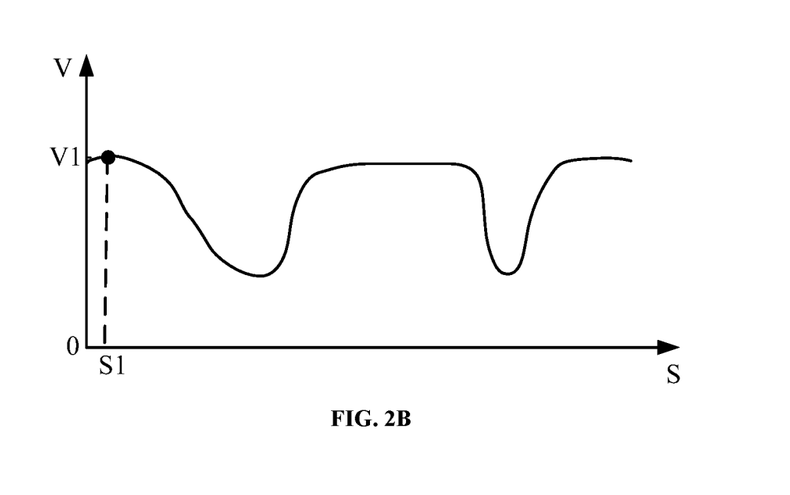
FIG. 2B is a schematic diagram of the safe speed according to another embodiment of the present disclosure.

If the safe speed of each position is as shown in FIG. 2B and the maximum safe speed among the safe speeds of each position in FIG. 2B is the safe speed v1 corresponding to a point s1, then the replay trajectory can be generated based on the safe speed v1 corresponding to the point s1, and the aircraft can be controlled to perform the trajectory replay at the maximum safe speed v1.

In another embodiment, when generating the replay trajectory based on the safe speed of each position, the replay trajectory may be generated based on the relationship between the safe speed of each position and the predetermined speed. More specifically, the safe speeds may be compared with the predetermined speed, such that the safe speed of a section of the trajectory that is greater than or equal to the predetermined speed may be determined as a second trajectory section, and the safe speed of a section of the trajectory that is less than the predetermined speed may be determined as a first trajectory section. In one embodiment, the predetermined speed may be a speed set by the user, and the safe speed may be the maximum safe speed at which the aircraft can maintain a safe flight. Since the safe speed of each position in the first trajectory section is less than the predetermined speed, the first trajectory section may also be a non-adjustable section in the replay trajectory. Since the safe speed of each position in the second trajectory section is greater than the predetermined speed, the second trajectory section may also be an adjustable section in the replay trajectory.

After generating the replay trajectory based on the relationship between the safe speed and the predetermined speed of each position, a plurality of trajectory sections in the replay trajectory may be obtained based on the relationship between the safe speed and the predetermined speed. Therefore, different control instructions may be generated based on different trajectory sections to control the aircraft to perform the trajectory replay at different speeds in different trajectory sections.

Figure 2C:
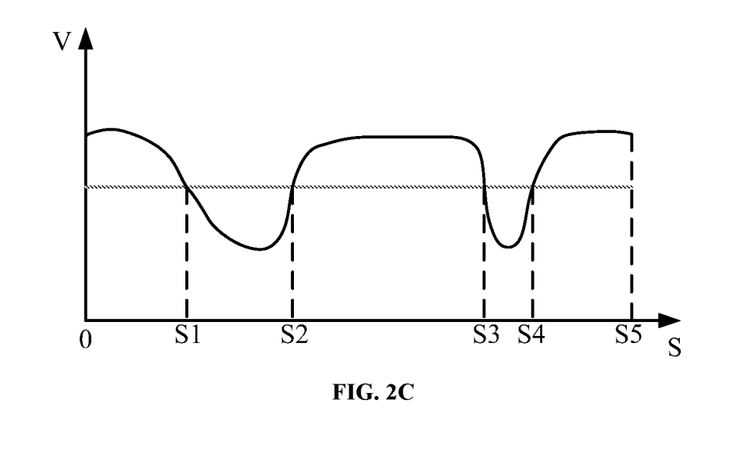
FIG. 2C is a schematic diagram of a relationship between the safe speed and a predetermined speed according to an embodiment of the present disclosure.
Figure 3:
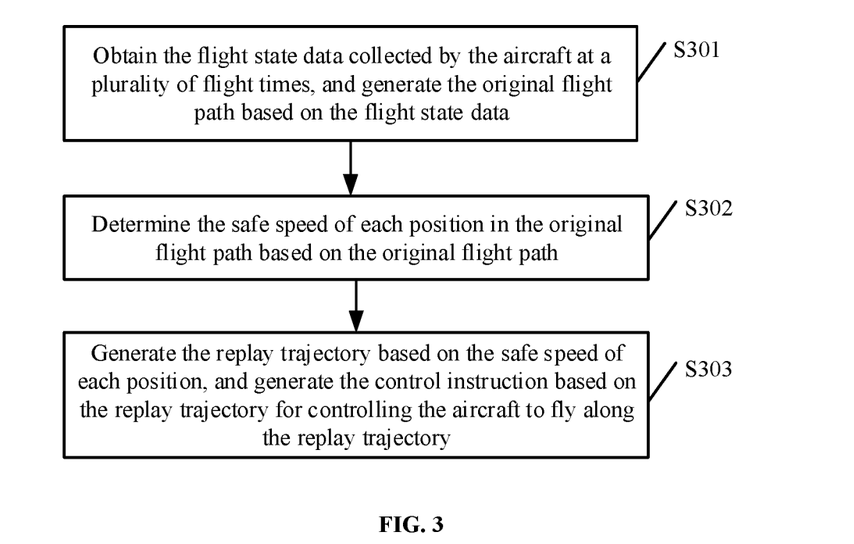
FIG. 3 is a flowchart of a flight trajectory replay method according to an embodiment of the present disclosure.

When generating the replay trajectory including a plurality of trajectory sections based on the relationship between the safe speed and the present disclosure, if the relationship between the safe speed and the predetermined speed is as shown in FIG. 2C, where a black curve is used to represent the safe speed of each tracking point and a gray curve is used to represent the predetermined speed as shown in FIG. 2C, the predetermined speed is greater than the minimum safe speed among the safe speeds of each position, and the predetermined speed is also less than the maximum safe speed among the safe speeds of each position. Therefore, the replay trajectory generated based on the relationship shown in FIG. 2C includes the first trajectory sections s1-s2 and s3-s4, and the second trajectory sections 0-s1, s2-s3, and s4-s5. A first control instruction may be generated based on the first trajectory sections to control the flight of the aircraft in the first trajectory sections. In addition, a second control instruction may be generated based on the second trajectory sections to control the flight of the aircraft in the second trajectory sections FIG. 3 is a flowchart of a flight trajectory replay method according to an embodiment of the present disclosure. As shown in FIG. 3, the method may include the following processes.

S301, obtaining the flight state data collected by the aircraft at a plurality of flight times, and generating the original flight path based on the flight state data.

The flight state data of the aircraft may be obtained by a sensor mounted on the aircraft. The sensor may include one or more of an inertial measurement unit, a GNSS sensor, a multi-axis accelerometer, and a multi-axis gyroscope. The aircraft may determine the flight state data of the aircraft at the plurality of flight times based on the sensor data collected by the aforementioned sensors. In one embodiment, the flight state data may include at least one of the position, speed, and acceleration of the aircraft. The flight state data may also include time.

In one embodiment, the flight state data may include time, position, speed, and acceleration information collected by the aircraft at a plurality of flight times. After the aircraft collects the plurality of flight state data at the plurality of flight times, the original flight path may be generated based on the flight state data. In another embodiment, the flight state data may also be sent to a control device (such as an external device such as a remote control) that can establish a communication connection with the aircraft, and the control device may generate the original flight path based on the flight state data. Further, based on the communication connection between the aircraft and the control device, the aircraft may obtain the original flight path generated based on the flight state data from the control device.

In this embodiment, it mainly describes the implementation of generating the original flight path by the aircraft based on the flight state data, and the implementation of executing the processes at S102 and S103 by the aircraft in detail. For the implementation of generating the original flight path by the control device based on the flight state data, and the implementation of executing the processes at S102 and S103 by the control device, reference may be made to the relevant description of the subsequent embodiments, which will not be described in detail in this embodiment.

In one embodiment, the aircraft may collect the flight state data at the plurality of flight times at a predetermined time interval, or collect the flight state data at the corresponding times before and after the change when a change of the flight state data is detected, or collect the flight state data at a plurality of times based on a predetermined number of intervals.

When the aircraft generates the original flight path based on the flight state data, the flight trajectory curve of the aircraft may be generated based on the position of the aircraft at different times included in the flight state data. Further, the original flight path may be generated based on the different accelerations and different speeds corresponding to the aircraft at different times, and the generated flight trajectory curve. The original flight path can record the position of the position of the aircraft at different flight times, and data such as the speed and acceleration corresponding to each position.

S302, determining the safe speed of each position in the original flight path based on the original flight path.

In one embodiment, the safe speed may refer to the maximum speed at which the aircraft can safely pass through various positions, and the aircraft may determine the different safe speeds corresponding to each position based on the flight state data of different positions in the original flight path. For example, the safe speed of the aircraft when it is at the tracking point at a higher position may be different from the safe speed of the aircraft at the tracking point at a lower position. In another example, the safe speed of the aircraft at the same altitude under different accelerations and/or different speeds may also be different.

In another embodiment, the aircraft may also determine the safe speed of each position based on its own performance. The performance of the aircraft may include the performance of the aircraft's power system, the performance of the aircraft's shell material, and the assembly process of the aircraft, etc.

In one embodiment, the safe speed of each position in the original flight path may be used to generate the replay trajectory, and perform the process at S303.

S303, generating the replay trajectory based on the safe speed of each position, and generating the control instruction based on the replay trajectory for controlling the aircraft to fly along the replay trajectory.

In one embodiment, when generating the replay trajectory based on the safe speed of each position, the minimal value of the safe speed of each position may be determined, and the replay trajectory may be generated based on the minimum safe speed. When replaying the trajectory, the replay may be performed at the minimum safe speed. Or, the replay trajectory may be generated based on the maximum value of the safe speed of each position, that is, based on the maximum safe speed, such that when the trajectory is replayed, the replay may be performed at the maximum safe speed. Or, the replay trajectory may be generated based on the relationship between the safe speed and the predetermined speed, and the trajectory replay may be performed based on the relationship between the safe speed and the predetermined speed.

Figure 4:
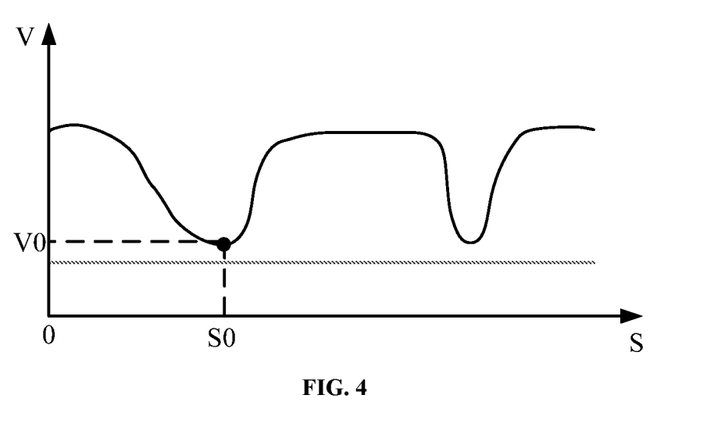
FIG. 4 is a schematic diagram of the relationship between the safe speed and the predetermined speed according to another embodiment of the present disclosure.

When the aircraft generates the replay trajectory based on the relationship between the safe speed and the present disclosure, if the predetermined speed is greater than the minimum safe speed and less than the maximum safe speed as shown in FIG. 2C, then the sections of the replay trajectory may be determined. Based on the sections, different control instructions may be generated for the replay trajectory in different sections, such that the replay trajectory in different sections can fly with reference to different flight data. Alternatively, if the predetermined speed is less than the minimum safe speed as shown in FIG. 4, where the predetermined speed represented by the gray line is less than minimum value v0 of the safe speed at each position represented by the black line. When the trajectory is replayed, the safe speed corresponding to each position in the replayed trajectory may be adjusted to the predetermined speed, and the flight may be carried out at a constant speed based on the predetermined speed.

In the embodiments of the present disclosure, the aircraft can generate the original flight path based on the flight state data collected at a plurality of times, such that the replay trajectory can be generated based on the safe speed of each position in the original flight path, such that the aircraft can be controlled to fly along the replay trajectory. Since the safe speed of each position can include the maximum safe speed and the minimum safe speed, different replay trajectories can be generated based on the difference of the safe speed. In addition, different replay trajectories can also be generated based on the relationship between the safe speed and the predetermined speed, making the generated replay trajectory more in line with actual needs, and ensuring that the trajectory replay process is performed at a constant speed based on the safe speed.

To reduce the data processing pressure of the aircraft, the aircraft may be connected to an external control device. The control device and the aircraft may establish a communication connected through a built-in communication device, such that the control device can receive the flight state data collected by the aircraft at a plurality of times through the communication connection, such that the control device can process the flight state data to generate the control instruction for controlling the aircraft, and send the control instruction to the aircraft to control the aircraft to perform a replay flight based on the instruction of the control instruction.

Figure 5:
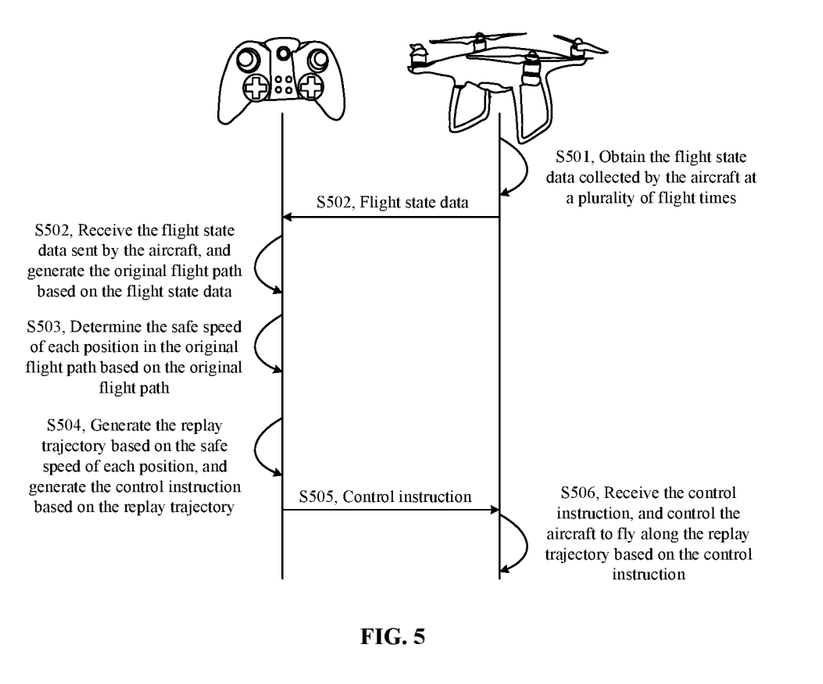
FIG. 5 is a flowchart of the flight trajectory replay method according to another embodiment of the present disclosure.

More specifically, FIG. 5 is a flowchart of the flight trajectory replay method according to another embodiment of the present disclosure. The method includes the following processes.

S501, the aircraft obtains the flight state data collected by the aircraft at a plurality of flight times.

S502, the control device receives the flight state data sent by the aircraft, and generates the original flight path based on the flight state data.

S503, the control device determines the safe speed of each position in the original flight path based on the original flight path.

S504, the control device generates the replay trajectory based on the safe speed of each position, and generates the control instruction based on the replay trajectory.

S505, the control device sends the control instruction to the aircraft.

S506, the aircraft receives the control instruction, and controls the aircraft to fly along the replay trajectory based on the control instruction.

In the processes at S501 to S505, for the specific implementation when the control device performs the processes at S502 to S505, reference may be made to the subsequent embodiments where the aircraft is used to perform the specific implementation of the processes of "the aircraft control device receives the flight state data and generates the original flight path based on the flight state data; the control device determines the safe speed of each position in the original flight path based on the original flight path; the control device generates the replay trajectory based on the safe speed of each position, and generates the control instruction based on the replay trajectory; and the control device sends the control instruction to the aircraft."

In the embodiments of the present disclosure, after the aircraft collects the flight state data at a plurality of times, the flight state data can be sent to a control device that can establish a communication connection with the aircraft, and the control device can generate the original flight path based on the flight state data. Further, after the safe speed of each position is determined based on the original flight path, a replay trajectory can be generated in the control device, and the control instruction generated based on the replay trajectory can be sent to the aircraft. In this way, the aircraft can replay the replay trajectory based on the control instruction, which can reduce the data processing pressure of the aircraft.

Different replay trajectories may be generated based on the relationship between the safe speed and the predetermined speed of each position in the original flight path, and corresponding control instructions may be generated based on the difference of the replay trajectories, such that the aircraft can control the aircraft to fly along the replay trajectory at a constant speed.

Figure 6:
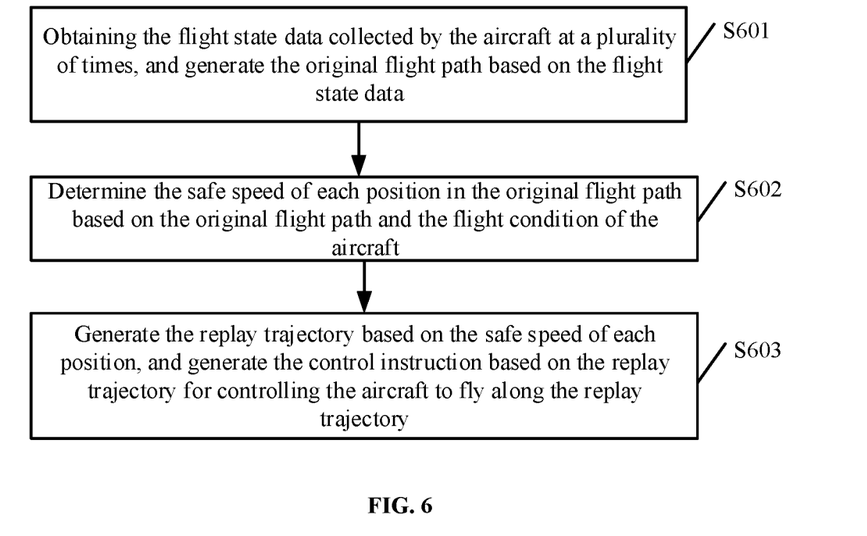
FIG. 6 is a flowchart of the flight trajectory replay method according to another embodiment of the present disclosure.

More specifically, FIG. 6 is a flowchart of the flight trajectory replay method according to another embodiment of the present disclosure. As shown in FIG. 6, the method includes the following processes.

S601, obtaining the flight state data collected by the aircraft at a plurality of times, and generating the original flight path based on the flight state data.

In one embodiment, for the specific implementation of the process at S601, reference may be made to the process at S301 described above, which will not be repeated here.

S602, determining the safe speed of each position in the original flight path based on the original flight path and the flight condition of the aircraft.

The flight condition may include at least the maximum speed, the maximum acceleration, or the maximum attitude angular velocity of the aircraft. In one embodiment, the acceleration of the aircraft may be adjusted by adjusting the attitude angular velocity, thereby adjusting the speed of the aircraft.

Based on the constraints of kinematics and dynamics, when the attitude angular velocity is adjusted to the maximum, the acceleration of the aircraft can also reach the maximum value. When the acceleration continues to increase to the maximum value, the speed of the aircraft can be accelerated to the maximum value. Therefore, the maximum safe speed of each position in the original flight path may be determined based on the maximum speed, the maximum acceleration, and/or the maximum attitude angular velocity corresponding to each position in the original flight path.

Figure 7A:
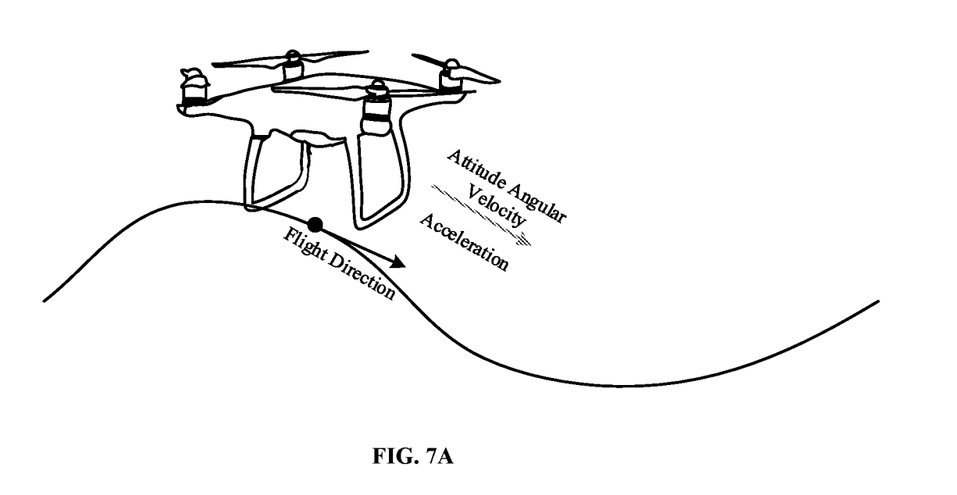
FIG. 7A is a schematic diagram the flight state data according to an embodiment of the present disclosure.

When the increasing direction of the attitude angular velocity and the acceleration is consistent with the flight direction of the aircraft, as the attitude angular velocity increases, the acceleration may also increase. The attitude angular velocity may be increased to the maximum positive maximum attitude angular velocity, and the velocity may be increased to the maximum positive maximum acceleration. During the increase of the attitude angular velocity and the acceleration, the continuous increase of the aircraft speed may be maintained. As shown in FIG. 7A, if the flight direction of the aircraft during the replay trajectory is as shown by the black arrow in FIG. 7A, when the increasing direction of the attitude angular velocity and the acceleration is consistent with the direction indicated by the black arrow, when the attitude angular velocity and the acceleration reach increase to the maximum, the maximum positive attitude angular velocity and the maximum positive angular velocity may be obtained to ensure the flight speed of the aircraft can continue to increase in the flight direction.

In another embodiment, during the flight of the aircraft, by adjusting the attitude angular velocity, the attitude angular velocity may continue to decrease (that is, the reverse of the continuous increase), until it is decreased to the reverse maximum attitude angular velocity. The acceleration may also continue to decrease to the reverse maximum acceleration along with the adjustment of the attitude angular velocity, such that the speed of the aircraft can be adjusted to the reverse maximum speed. Then, based on the original flight path, the reverse maximum speed of the aircraft, the reverse maximum acceleration, and/or the reverse maximum attitude angular velocity, the minimum safe speed of each position in the original flight path may be determined.

Figure 7B:
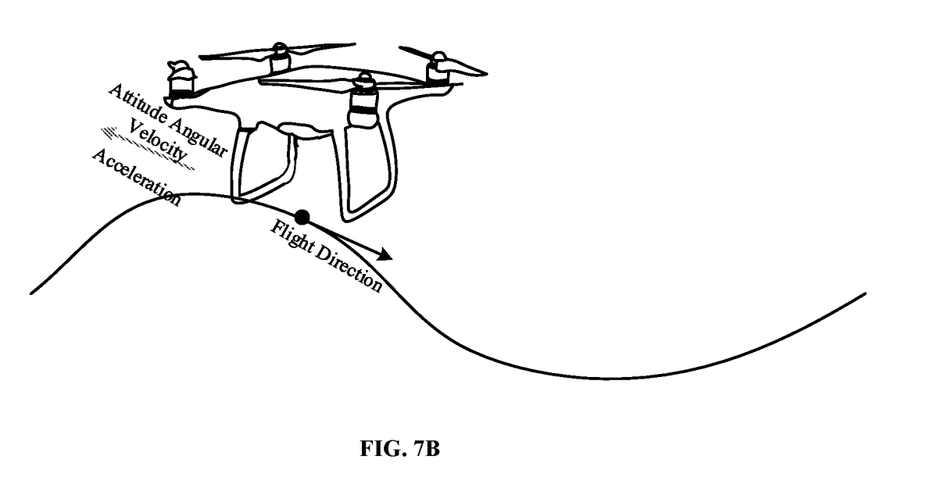
FIG. 7B is a schematic diagram the flight state data according to another embodiment of the present disclosure.

When the increasing direction of the attitude angular velocity and the acceleration is opposite to the flight direction of the aircraft, as the attitude angular velocity increases, the acceleration may also increase. The attitude angular velocity may be increased to the maximum positive maximum attitude angular velocity, and the velocity may be increased to the maximum positive maximum acceleration. During the increase of the attitude angular velocity and the acceleration, the continuous decrease of the aircraft speed may be maintained. As shown in FIG. 7B, when the increasing direction of the attitude angular velocity and the acceleration is inconsistent with the direction indicated by the black arrow, when the attitude angular velocity and the acceleration increase to the maximum, the reverse maximum attitude angular velocity and the reverse maximum angular velocity may be obtained to ensure the flight speed of the aircraft can continue to decrease in the flight direction.

S603, generating the replay trajectory based on the safe speed of each position, and generating the control instruction based on the replay trajectory for controlling the aircraft to fly along the replay trajectory.

In one embodiment, the aircraft may generate the replay trajectory based on the minimum safe speed of each position. More specifically, the minimum safe speed may be determined from the safe speed of each position first, and the replay trajectory may be generated at the minimum safe speed. As such, the control instruction can be generated based on the minimum safe speed, and the control instruction can be used to control the aircraft to replay the replay trajectory at the minimum safe speed, thereby ensuring that the aircraft maintains a constant speed during the replay.

In another embodiment, when the aircraft generates the replay trajectory based on the safe speed of each position, the speed of each position in the replay trajectory may also be determined based on the safe speed of each position and the flight condition of the aircraft (the flight condition may include at least the maximum speed, the maximum acceleration, or the maximum attitude angular velocity). That is, the aircraft may also generate the replay trajectory based on the maximum safe speed of each position, and replay the replay trajectory based on the maximum safe speed.

When determining the speed of each position of the aircraft in the replay trajectory, the acceleration section and/or the deceleration section in the replay trajectory may be determined first, and the maximum attitude angular velocity and the maximum acceleration of the aircraft may be taken for both the acceleration section and/or the deceleration section in the replay trajectory.

In another embodiment, when the aircraft generates the replay trajectory based on the safe speed of each position, it may also first generate the first trajectory section and the second trajectory section based on the safe speed of each position, the speed of each position in the first trajectory section being the predetermined speed. In some embodiments, generating the first trajectory section and the second trajectory section based on the safe speed and the predetermined speed of each position may include comparing the safe speed of each position with the predetermined speed to obtain a comparison result; generating the second trajectory section (the adjustable section described above) based on the position where the safe speed is greater than or equal to the predetermined speed in the comparison result; and, generating the first trajectory section (the non-adjustable section described above) based on the above comparison result where the safe speed is less than the predetermined speed. In one embodiment, the predetermined speed may be a speed set by the user.

In one embodiment, when generating the first trajectory section, the maximum attitude angular velocity and the maximum acceleration of the aircraft may be taken for both the acceleration section and the deceleration section of the first trajectory section. In another embodiment, the flight state data of the original flight path corresponding to each position in the first trajectory section may also be determined as the flight state data of the first trajectory section.

Since the safe speed referenced when generating the replay trajectory may be different, the replay trajectory generated based on the different safe speeds of each position may not be the same. Further, the control instructions generated based on the different replay trajectories may not be the same. That is, the aircraft may generate different replay trajectories based on the safe speed of each position, and generate the corresponding control instructions based on the replay trajectories to control the aircraft to fly along the generated replay trajectories.

In the embodiments of the present disclosure, the aircraft can generate the original flight path based on the obtained flight state data at a plurality of flight times, thereby determining the flight path and the flight condition of the aircraft; determine the safe speed of each position in the original flight path, thereby generating the replay trajectory based on the maximum safe speed, the minimum safe speed included in the safe speed, and/or the relationship between the safe speed and the predetermined speed; and generating the control instruction based on the replay trajectory. As such, the aircraft can be controlled to fly along the replay trajectory, and the replay trajectory can be generated while ensuring that the aircraft maintains a constant speed during the replay.

Next, the specific implementation for the aircraft to generate a replay trajectory including the first trajectory section and the second trajectory section based on the relationship between the safe speed of each position and the predetermined speed will be described in detail.

Since the safe speed of each position in the second trajectory section (i.e., the adjustable section) is greater than or equal to the predetermined speed, the flight speed of each position in the second trajectory section (the flight speed may be less than or equal to the maximum safe speed of each position) may be adjusted. Under the ideal condition, the flight speed of each position may be adjusted to the predetermined speed. During the adjustment process, if the flight state data of the aircraft (including the position p, the speed v, and the acceleration a) is adjusted from an initial flight state data $S_s=\{p_s,v_s,a_s\}$ to a target flight state data $S_e=\{p_e,v_e,a_e\}$, the state transition may be as follows.

(1) The aircraft uses the maximum attitude angular velocity $jerk_{max}$ to make the acceleration reach the maximum acceleration $a_{max}$ allowed by the aircraft.

(2) The attitude angular velocity jerk is set to 0, such that the aircraft can maintain the maximum acceleration $a_{max}$, such that the speed can be fast enough.

(3) Use the minimum attitude angular velocity $jerk_{min}$ to reduce the acceleration a to 0, and the velocity at this time can reach the maximum operating speed $v_{max}$.

(4) The attitude angular velocity jerk is set to 0, and the maximum speed is maintained to make the flight distance far enough.

(5) Reduce the acceleration to the minimum allowable acceleration $a_{min}$ at the minimum attitude angular velocity jerk.

(6) The attitude angular velocity jerk is set to 0, and the minimum acceleration is maintained to make the speed slow enough.

(7) Use the maximum attitude angular velocity $jerk_{max}$ to make the acceleration reach the end state $a_e$. At this time, the speed and position can also reach the corresponding speed and position of the end state, namely $p_e$ and $v_e$.

Based on the above transition process of the flight state data of the aircraft, the following constraint equations may be established.

$$\begin{cases} a_0 = a_s \\ v_0 = v_s \\ p_0 = p_s \\ a_7 = a_s \\ v_7 = v_e \\ p_7 = p_e \\ a_3 = 0 \end{cases} \quad (1)$$

$$\begin{cases} a_1 = a_0 + t_1 * jerk_{max} \\ a_2 = a_1 + t_2 * 0 \\ a_3 = a_2 + t_3 * jerk_{min} \\ a_4 = a_3 + t_4 * 0 \\ a_5 = a_4 + t_5 * jerk_{min} \\ a_6 = a_5 + t_6 * 0 \\ a_7 = a_6 + t_7 * jerk_{max} \end{cases} \quad (2)$$

$$\begin{cases} v_1 = v_0 + t_1 * a_0 + \frac{1}{2} * t_1^2 * jerk_{max} \\ v_2 = v_1 + t_2 * a_1 + \frac{1}{2} * t_2^2 * 0 \\ v_3 = v_2 + t_3 * a_2 + \frac{1}{2} * t_3^2 * jerk_{min} \\ v_4 = v_3 + t_4 * a_3 + \frac{1}{2} * t_4^2 * 0 \\ v_5 = v_4 + t_5 * a_4 + \frac{1}{2} * t_5^2 * jerk_{min} \\ v_6 = v_5 + t_6 * a_5 + \frac{1}{2} * t_6^2 * 0 \\ v_7 = v_6 + t_7 * a_6 + \frac{1}{2} * t_7^2 * jerk_{max} \end{cases} \quad (3)$$

$$\begin{cases} p_1 = p_0 + t_1 * v_0 + \frac{1}{2} * t_1^2 * a_0 + \frac{1}{6} * t_1^3 * jerk_{max} \\ p_2 = p_1 + t_2 * v_1 + \frac{1}{2} * t_2^2 * a_1 + \frac{1}{6} * t_2^3 * 0 \\ p_3 = p_2 + t_3 * v_2 + \frac{1}{2} * t_3^2 * a_2 + \frac{1}{6} * t_3^3 * jerk_{max} \\ p_4 = p_3 + t_4 * v_3 + \frac{1}{2} * t_4^2 * a_3 + \frac{1}{6} * t_4^3 * 0 \\ p_5 = p_4 + t_5 * v_4 + \frac{1}{2} * t_5^2 * a_4 + \frac{1}{6} * t_5^3 * jerk_{min} \\ p_6 = p_5 + t_6 * v_5 + \frac{1}{2} * t_6^2 * a_5 + \frac{1}{6} * t_6^3 * 0 \\ p_7 = p_6 + t_7 * v_6 + \frac{1}{2} * t_7^2 * a_6 + \frac{1}{6} * t_7^3 * jerk_{max} \end{cases} \quad (4)$$

It can be seen from the above equations that there are 28 equations and 31 unknown variables $\{a_0 \ldots a_7, t_1 \ldots t_7, v_0 \ldots v_7, p_0 \ldots p_7\}$. When solving the above four equation sets, three unknown variables need to be known such that he solved value can be a unique trajectory. Since the embodiments of the present disclosure needs to adjust the speed and acceleration, in one embodiment, the user set speed, maximum acceleration and minimum accelerate may be fixed. That is, $a_1=a_{max}$, $a_5=a_{min}$, and $v_3=v_{max}$.

After fixing the three unknown variables, the above four sets of equations can be calculated by Matlab to obtain the corresponding speed, acceleration, and mileage of each process in the seven state transition processes. Based on the seven state transition processes mentioned above, the time point of each process may be determined as:

$t_1=-(a_0-a_{max})/jerk_{max}$.

$t_2=(a_0^{2}*jerk_{min}*a_{max}*jerk_{min}+a_{max}*jerk_{max}-2*jerk_{min}*jerk_{max}*v_0+2*jerk_{min}*jerk_{max}*v_{max})/(2*a_{max}*jerk_{min}*jerk_{max})$ $t_3=-a_{max}/jerk_{min}$.

Figure 8A:
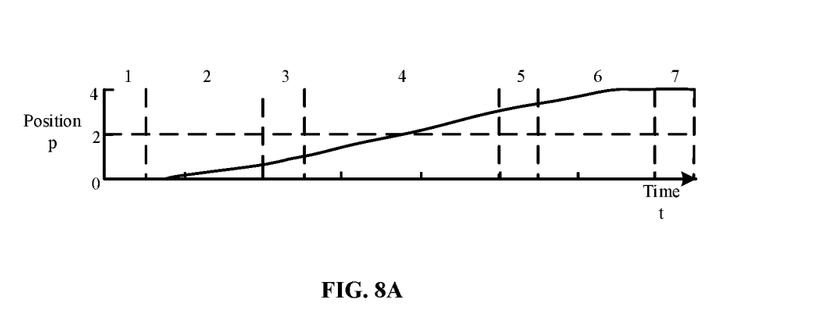
FIG. 8A is a schematic diagram of a position change of an aircraft during a state transition according to an embodiment of the present disclosure.
Figure 8B:
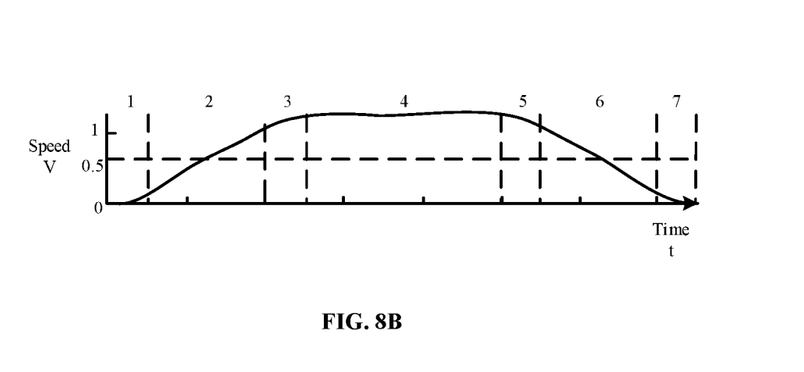
FIG. 8B is a schematic diagram of a speed change of an aircraft during the state transition according to an embodiment of the present disclosure.
Figure 8C:
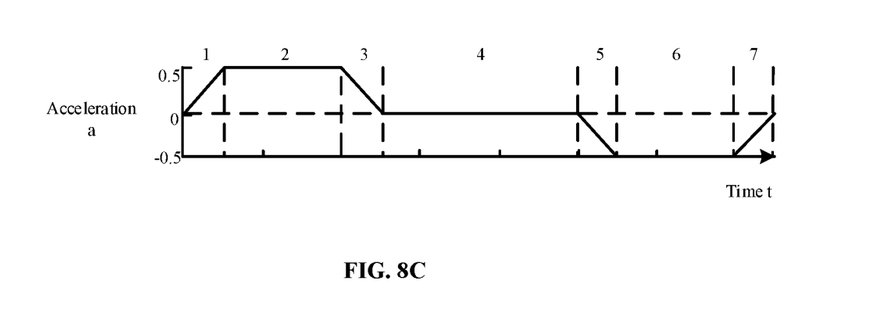
FIG. 8C is a schematic diagram of an acceleration change of an aircraft during the state transition according to an embodiment of the present disclosure.
Figure 8D:
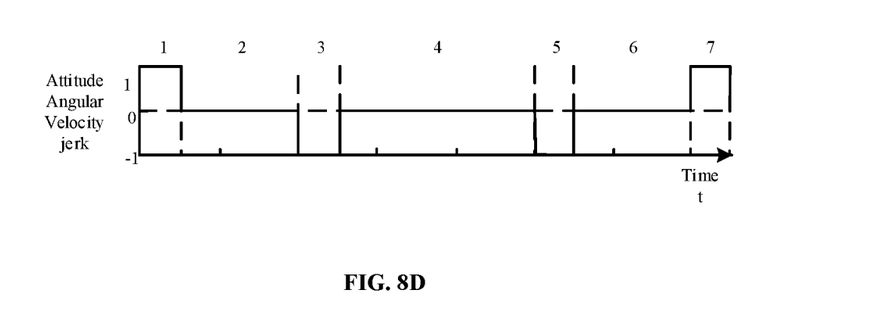
FIG. 8D is a schematic diagram of a change of an attitude angular velocity of an aircraft during the state transition according to an embodiment of the present disclosure

$t_4=(3*a_0*a_{min}*jerk_{min}^{2}-3*a_{end}^{4}*a_{max}*jerk_{min}^{2}-a_{min}*a_{max}^{4}*jerk_{min}^{2}+a_{min}^{4}*a_{max}*jerk_{min}^{2}+a_{min}*a_{max}^{4}*jerk_{max}^{2}+6*a_0^{2}*a_{min}*a_{max}^{2}*jerk_{min}^{2}-6*a_{end}^{2}*a_{min}^{2}*a_{max}*jerk_{min}^{2}+12*a_{min}*jerk_{min}^{2}*jerk_{max}^{2}*v_0^{2}-12*a_{max}*jerk_{min}^{2}*max*v_{end}-12*a_{min}*jerk_{max}*jerk_{min}^{2}*v_{max}+12*a_{max}*jerk_{max}^{2}*jerk_{min}^{2}*v_{max}^{2}-8*a_0^{3}*a_{max}*a_{min}*jerk_{min}^{2}+8*a_{end}^{3}*a_{max}*a_{min}*jerk_{min}^{2}-24*a_{max}*a_{min}*jerk_{min}^{2}*jerk_{max}^{2}*p_0+$ $24*a_{max}*a_{min}*jerk_{min}^2*jerk_{max}*p_{end}-$
$12*a_{min}*a_0^2*jerk_{min}^2*jerk_{max}*v_0-$
$12*a_{min}*a_{max}^2*jerk_{min}^2*jerk_{max}*v_0+$
$12*a_{end}^2*a_{max}*jerk_{min}^2*jerk_{max}*v_{end}+$
$12*a_{max}*a_{min}^2*jerk_{min}^2*jerk_{max}*v_{max}+$
$12*a_{min}*a_{max}^2*jerk_{min}^2*jerk_{max}*v_{max}-$
$12*a_{max}*a_{min}^2*jerk_{min}^2*jerk_{max}*v_{max}+$
$24*a_0*a_{max}*a_{min}*jerk_{min}^2*jerk_{max}*v_0-$
$24*a_{end}*a_{max}*a_{min}*jerk_{min}^2*jerk_{max}*v_{end})/$
$(24*a_{max}*a_{min}*jerk_{min}^2*jerk_{max}^2*v_{max}).$ $t_5 = a_{min}/jerk_{min}.$ $t_6 = -(a_{end}^2*jerk_{min} - a_{min}^2*jerk_{min} + a_{min}^2*jerk_{max} - 2*jerk_{min}*jerk_{max}*v_{end} + 2*jerk_{min}*jerk_{max}*v_{max})/(2*a_{min}*jerk_{min}*jerk_{max}).$ $t_7 = (a_{end} - a_{min})/*jerk_{max}.$ In one embodiment, in the seven phases of the state transition of the aircraft, the position p change can be as shown in FIG. 8A, the speed v change can be as shown in FIG. 8B, the acceleration a change can be as shown in FIG. 8C, and the attitude angular velocity jerk change can be as shown in FIG. 8D. In FIG. 8A to FIG. 8D, the seven phases involved in the state transition may be marked with Arabic numerals in FIG. 8A to FIG. 8D. For example, 1 may indicate the phase where $0 \le t \le t_1$, 2 may indicate the phase where $t_1 \le t \le t_2$, etc.

Figure 9:
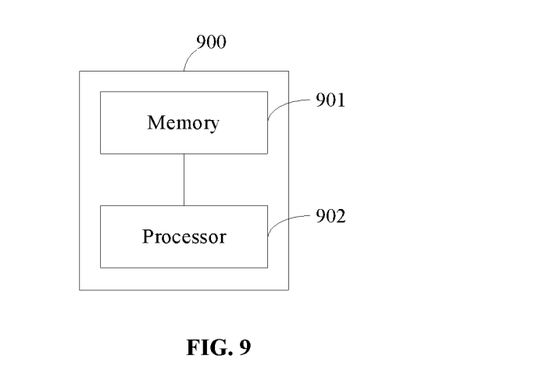
FIG. 9 is a schematic diagram a flight trajectory replay device for a mobile platform according to an embodiment of the present disclosure.

An embodiment of the present disclosure provides a flight trajectory replay device of a mobile platform. FIG. 9 is a schematic diagram a flight trajectory replay device of a mobile platform according to an embodiment of the present disclosure. As shown in FIG. 9, a flight trajectory replay device 900 of a mobile platform includes a memory 901 and a processor 902. The memory 901 can store program codes, and the processor 902 can call the program codes in the memory. When the program codes are executed, the processor 902 may perform the operations of obtaining the flight state data collected by the aircraft at a plurality of flight times and generating the original flight path based on the flight state data, the flight state data including at least one of the position, speed, and acceleration of the aircraft; determining the safe speed of each position in the original flight path based on the original flight path; and generating the replay trajectory based on the safe speed of each position and generating the control instruction based on the replay trajectory for controlling the aircraft to fly along the replay trajectory.

In one embodiment, when determining the safe speed of each position in the original flight path based on the original flight path, the processor 902 may be configured to determine the safe speed based on the original flight path and the flight condition of the aircraft, the flight condition including at least he maximum speed, maximum acceleration, or maximum attitude angular velocity of the aircraft.

In one embodiment, when generating the replay trajectory based on the safe speed of each position, the processor 902 may be configured to determine the minimum safe speed from the safe speed of each position, and generate the replay trajectory at the minimum safe speed.

In one embodiment, when generating the replay trajectory at the minimum safe speed, the processor 902 may be configured to determine that the speed in the replay trajectory is the minimum safe speed. Generating the control instruction based on the replay trajectory for controlling the aircraft to fly along the replay trajectory may include generating the control instruction for controlling the aircraft to fly along the replay trajectory at the minimum safe speed.

In one embodiment, when generating the replay trajectory based on the safe speed of each position, the processor 902 may be configured to determine the speed of each position in the replay trajectory based on the safe speed of each position and the flight condition of the aircraft, the flight condition including at least the maximum speed, maximum acceleration, or maximum attitude angular velocity of the aircraft.

In one embodiment, when determining the speed of each position of the replay trajectory, the processor 902 may be configured to use the maximum attitude angular velocity and the maximum acceleration of the aircraft for the acceleration section or the deceleration section in the replay trajectory.

In one embodiment, when generating the replay trajectory based on the safe speed of each position, the processor 902 may be configured to generating the first trajectory section and the second trajectory section based on the safe speed and the predetermined speed of each position, the speed of each position in the first trajectory section being the predetermined speed.

In one embodiment, when generating the first trajectory section and the second trajectory section based on the safe speed and the predetermined speed of each position, the processor 902 may be configured to compare the safe speed of each position with the predetermined speed to obtain a comparison result; generate the second trajectory section based on the position where the safe speed is greater than or equal to the predetermined speed in the comparison result; and generate the first trajectory section based on the position where the safe speed is less than the predetermined speed in the comparison result.

In one embodiment, when generating the first trajectory section based on the position where the safe speed is less than the predetermined speed in the comparison result, the processor 902 may be configured to take the maximum attitude angular velocity and the maximum acceleration of the aircraft for the acceleration section or the deceleration section in the first trajectory section.

In one embodiment, when generating the first trajectory section based on the position where the safe speed is less than the predetermined speed in the comparison result, the processor 902 may be configured to determine the flight state data of the original flight path corresponding to each position of the first trajectory section as the flight state data of the first trajectory section.

The flight trajectory replay device of the mobile platform provided in this embodiment may execute the flight trajectory replay method as shown in FIG. 3 and FIG. 6 provided in the foregoing embodiments. The execution method and beneficial effects are similar, and will not be repeated here.

Figure 10:
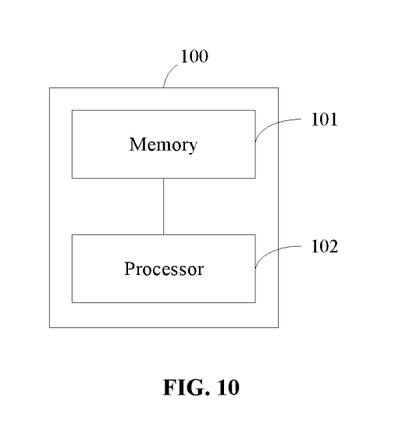
FIG. 10 is a schematic diagram the flight trajectory replay device for the mobile platform according to another embodiment of the present disclosure.

Another embodiment of the present disclosure provides a flight trajectory replay device of a mobile platform. FIG. 10 is a schematic diagram the flight trajectory replay device for the mobile platform according to another embodiment of the present disclosure. As shown in FIG. 10, a flight trajectory replay device 100 of a mobile platform includes a memory 101 and a processor 102. The memory 101 can store program codes, and the processor 102 can call the program codes in the memory. When the program codes are executed, the processor 102 may perform the operations of causing the control device to obtain the flight state data from the mobile platform as shown in FIG. 9 through communication, the flight state data being obtained by the mobile platform through a sensor mounted on the mobile platform; determining the safe speed of each position in the original flight path based on the original flight path; generating the replay trajectory based on the safe speed of each position, and generating the control instruction based on the replay trajectory; and sending the generated control instruction to the mobile platform through communication.

In one embodiment, when generating the replay trajectory based on the safe speed of each position, the processor 902 may be configured to determine the minimum safe speed from the safe speed of each position, and generate the replay trajectory at the minimum safe speed.

In one embodiment, when generating the replay trajectory at the minimum safe speed, the processor 902 may be configured to determine that the speed in the replay trajectory is the minimum safe speed. Generating the control instruction based on the replay trajectory for controlling the aircraft to fly along the replay trajectory may include generating the control instruction for controlling the aircraft to fly along the replay trajectory at the minimum safe speed.

In one embodiment, when generating the replay trajectory based on the safe speed of each position, the processor 902 may be configured to determine the speed of each position in the replay trajectory based on the safe speed of each position and the flight condition of the aircraft, the flight condition including at least the maximum speed, maximum acceleration, or maximum attitude angular velocity of the aircraft.

In one embodiment, when determining the speed of each position of the replay trajectory, the processor 902 may be configured to take the maximum attitude angular velocity and the maximum acceleration of the aircraft for the acceleration section or the deceleration section in the replay trajectory.

In one embodiment, when generating the replay trajectory based on the safe speed of each position, the processor 902 may be configured to generating the first trajectory section and the second trajectory section based on the safe speed and the predetermined speed of each position, the speed of each position in the first trajectory section being the predetermined speed.

In one embodiment, when generating the first trajectory section and the second trajectory section based on the safe speed and the predetermined speed of each position, the processor 902 may be configured to compare the safe speed of each position with the predetermined speed to obtain a comparison result; generate the second trajectory section based on the position where the safe speed is greater than or equal to the predetermined speed in the comparison result; and generate the first trajectory section based on the position where the safe speed is less than the predetermined speed in the comparison result.

In one embodiment, when generating the first trajectory section based on the position where the safe speed is less than the predetermined speed in the comparison result, the processor 902 may be configured to take the maximum attitude angular velocity and the maximum acceleration of the aircraft for the acceleration section or the deceleration section in the first trajectory section.

In one embodiment, when generating the first trajectory section based on the position where the safe speed is less than the predetermined speed in the comparison result, the processor 902 may be configured to determine the flight state data of the original flight path corresponding to each position of the first trajectory section as the flight state data of the first trajectory section.

Finally, it should be noted that the foregoing embodiments are merely intended for describing the technical solutions of the present disclosure, but not to limit the present disclosure. Although the present disclosure is described in detail with reference to the foregoing embodiments, it should be understood by those of ordinary skill in the art that the technical solutions described in the foregoing embodiments may still be modified, or a part or all of the technical features may be equivalently replaced without departing from the spirit and scope of the present disclosure. As a result, these modifications or replacements do not make the essence of the corresponding technical solutions depart from the scope of the technical solutions of the present disclosure.

What is claimed is:

1. A flight trajectory replay method comprising:
obtaining flight state data collected by an aircraft at a plurality of flight times, and generating an original flight path based on the flight state data, wherein the flight state data includes at least one of a position, a speed, or an acceleration, of the aircraft; and
generating a replay trajectory based on a safe speed of each of one or more positions in the original flight path, and generating a control instruction based on the replay trajectory for controlling the aircraft to fly along the replay trajectory, generating the replay trajectory based on the safe speed including:
generating a first trajectory section of the replay trajectory based on a position where the safe speed is less than a predetermined speed; and
generating a second trajectory section of the replay trajectory based on a position where the safe speed is greater than or equal to the predetermined speed.

2. The method of claim 1, further comprising:
determining the safe speed of each of the one or more positions in the original flight path based on the original flight path including:
determining the safe speed based on the original flight path and a flight condition of the aircraft,
wherein the flight condition includes at least one of a maximum speed, a maximum acceleration, or a maximum attitude angular velocity, of the aircraft.

3. The method of claim 1, wherein generating the replay trajectory based on the safe speed further includes:
determining a minimum safe speed from the safe speed of each of the one or more positions in the original flight path; and
generating the replay trajectory by using the minimum safe speed.

4. The method of claim 3, wherein:
generating the replay trajectory by using the minimum safe speed includes:
determining a speed in the replay trajectory is the minimum safe speed; and
generating the control instruction based on the replay trajectory for controlling the aircraft to fly along the replay trajectory includes:
generating the control instruction for controlling the aircraft to fly at a constant speed along the replay trajectory at the minimum safe speed.

5. The method of claim 1, wherein generating the replay trajectory based on the safe speed further includes:
determining a speed of the replay trajectory based on the safe speed and the flight condition of the aircraft,
wherein the flight condition includes at least one of a maximum speed, a maximum acceleration, or a maximum attitude angular velocity, of the aircraft.

6. The method of claim 5, wherein determining the speed of the replay trajectory includes:
using the maximum attitude angular velocity and the maximum acceleration of the aircraft for an acceleration section or a deceleration section in the replay trajectory.

7. The method of claim 1, wherein a speed in the first trajectory section is the predetermined speed.

8. The method of claim 1, wherein generating the replay trajectory based on the safe speed further includes:
comparing the safe speed with the predetermined speed to obtain a comparison result.

9. The method of claim 1, wherein generating the first trajectory section of the replay trajectory based on the position where the safe speed is less than the predetermined speed includes:
using a maximum attitude angular velocity and a maximum acceleration of the aircraft for an acceleration section or a deceleration section in the first trajectory section.

10. The method of claim 1, wherein generating the first trajectory section of the replay trajectory based on the position where the safe speed is less than the predetermined speed includes:
determining the flight state data of the original flight path corresponding to each of one or more positions of the first trajectory section $a_s$ flight state data of the first trajectory section.

11. A mobile platform comprising:
a body;
a power system mounted on the body for providing power to the mobile platform; and
a flight trajectory replay device, comprising a memory and a processor, wherein:
the memory is configured to store program codes; and
the processor is configured to call the program codes, and when the program codes being executed, configured to perform:
obtaining flight state data collected by an aircraft at a plurality of flight times, and generating an original flight path based on the flight state data, wherein the flight state data includes at least one of a position, a speed, or an acceleration, of the aircraft; and
generating a replay trajectory based on a safe speed of each of one or more positions in the original flight path, and generating a control instruction based on the replay trajectory for controlling the aircraft to fly along the replay trajectory, generating the replay trajectory based on the safe speed including:
generating a first trajectory section of the replay trajectory based on a position where the safe speed is less than a predetermined speed; and
generating a second trajectory section of the replay trajectory based on a position where the safe speed is greater than or equal to the predetermined speed.

12. The mobile platform of claim 11, wherein the processor of the flight trajectory replay device is further configured to perform:
determining the safe speed based on the original flight path and a flight condition of the aircraft, wherein the flight condition includes at least one of a maximum speed, a maximum acceleration, or a maximum attitude angular velocity, of the aircraft.

13. The device of claim 11, wherein when generating the replay trajectory based on the safe speed, the processor of the flight trajectory replay device is further configured to perform:
determining a minimum safe speed from the safe speed of each of the one or more positions in the original flight path; and
generating the replay trajectory by using the minimum safe speed.

14. The device of claim 13, wherein:
when generating the replay trajectory by using the minimum safe speed, the processor of the flight trajectory replay device is configured to perform:
determining a speed in the replay trajectory is the minimum safe speed; and
when generating the control instruction based on the replay trajectory for controlling the aircraft to fly along the replay trajectory, the processor of the flight trajectory replay device is configured to perform:
generating the control instruction for controlling the aircraft to fly at a constant speed along the replay trajectory at the minimum safe speed.

15. The device of claim 11, wherein when generating the replay trajectory based on the safe speed, the processor of the flight trajectory replay device is further configured to perform:
determining a speed of the replay trajectory based on the safe speed and the flight condition of the aircraft, wherein the flight condition includes at least one of a maximum speed, a maximum acceleration, or a maximum attitude angular velocity, of the aircraft.

16. The device of claim 15, wherein when determining the speed of the replay trajectory, the processor of the flight trajectory replay device is configured to perform:
using the maximum attitude angular velocity and the maximum acceleration of the aircraft for an acceleration section or a deceleration section in the replay trajectory.

17. The device of claim 11, wherein a speed of the first trajectory section is the predetermined speed.

18. The device of claim 11, wherein when generating the replay trajectory based on the safe speed, the processor of the flight trajectory replay device is further configured to perform:
comparing the safe speed with the predetermined speed to obtain a comparison result.

19. The device of claim 11, wherein when generating the first trajectory section of the replay trajectory based on the position where the safe speed is less than the predetermined speed, the processor of the flight trajectory replay device is configured to perform:
using a maximum attitude angular velocity and a maximum acceleration of the aircraft for an acceleration section or a deceleration section in the first trajectory section.

20. The device of claim 11, wherein when generating the first trajectory section of the replay trajectory based on the position where the safe speed is less than the predetermined speed, the processor of the flight trajectory replay device is configured to perform:
determining the flight state data of the original flight path corresponding to each of one or more positions of the first trajectory section $a_s$ flight state data of the first trajectory section.

* * * * *